US 6,666,588 B1

(12) United States Patent
Thorsten et al.

(10) Patent No.: US 6,666,588 B1
(45) Date of Patent: Dec. 23, 2003

(54) COLLIMATOR ARRAY HAVING PRECISELY ALIGNED OPTICAL BEAMS AND METHOD OF ASSEMBLING SAME

(75) Inventors: Neal H. Thorsten, Lebanon, NJ (US); Christopher S. Koeppen, New Hope, PA (US); Steven E. Parks, Mertztown, PA (US); Wayne F. Thomas, Manasquan, NJ (US); Kenneth R. Mahon, Piscataway, NJ (US)

(73) Assignee: Photuris, Inc., Piscataway, NJ (US)

( * ) Notice: Subject to any disclaimer, the term of this patent is extended or adjusted under 35 U.S.C. 154(b) by 0 days.

(21) Appl. No.: 10/264,345

(22) Filed: Oct. 3, 2002

(51) Int. Cl.$^7$ .................................................. G02B 6/36
(52) U.S. Cl. .......................................... 385/79; 385/78
(58) Field of Search .............................. 385/79, 78, 76, 385/75, 61, 60, 55

(56) References Cited

U.S. PATENT DOCUMENTS

| 5,661,829 A | * | 8/1997 | Zheng ........................... 385/33 |
| 5,815,318 A | | 9/1998 | Dempewolf et al. ......... 359/653 |
| 6,168,319 B1 | | 1/2001 | Francis ........................... 385/79 |
| 6,246,812 B1 | | 6/2001 | Liu et al. ....................... 385/34 |
| 6,246,813 B1 | | 6/2001 | Zheng ........................... 385/34 |

* cited by examiner

Primary Examiner—Hung Xuan Dang
(74) Attorney, Agent, or Firm—Mayer Fortkort & Williams, PC; Stuart H. Mayer, Esq.

(57) ABSTRACT

A method is provided for assembling an optical collimator array. The method begins by directing light through a first optical collimator to produce a first optical output beam. The first collimator is supported by a first carrier element. The first collimator is rotated about its central longitudinal axis to adjust a position of the first optical output beam on a surface that intercepts the first optical output beam. The first carrier element is then rotated about a carrier axis perpendicular to the central longitudinal axis and in a plane containing the central longitudinal axis to further adjust the position of the first optical output beam on the surface. The first collimator continues to be rotated about these axes until the first optical output beam is located at a desired position on the surface, at which point the first optical collimator is secured to the first carrier element. Next, the first carrier element itself is secured to prevent rotation about the carrier axis. The aforementioned steps are repeated for a second optical collimator producing a second optical output beam, which is supported by a second carrier element. The second optical collimator continues to be rotated about the two axes until the second optical output beam is located at a second position on the surface that is offset from the position of the first optical output beam by a prescribed amount. Finally, the second optical collimator is secured to the second carrier element and the second carrier element is secured to the first carrier element.

17 Claims, 3 Drawing Sheets

COLLIMATOR ARRAY HAVING PRECISELY ALIGNED OPTICAL BEAMS AND METHOD OF ASSEMBLING SAME

FIELD OF THE INVENTION

The present invention relates generally to optical components employing optical fibers, and more particularly to optical collimators.

BACKGROUND OF THE INVENTION

As the capacity required of wavelength division multiplexed (WDM) optical transmission systems continues to grow, the fiber optic component industry is confronted with increasingly stringent requirements for high performance fiber optic devices. In most cases one or more fibers are led into an optical device by an optical collimator, which provides low-loss transmission between the fiber and the optical device. In general and somewhat abstract terms, the input light entering the optical device via the collimator interacts with some optical component and the resulting light exits the optical device via one or more fibers that are also incorporated in optical collimators. One example of such an optical device is a wavelength division multiplexer that is based on an optical component such as a dielectric interference filter, which transmits or reflects selected wavelengths. As a basic building block of fiber optic devices, the performance characteristics of the optical collimators strongly heavily determines the level of performance of the fiber optic devices.

A commercially available optical collimator includes as its most fundamental components the fiber, a ferrule that holds the exposed fiber end, a collimating lens, an outer sleeve for containing the assembly and a means to position the fiber tip at the focal point of the collimating lens. Typically, a GRIN-type lens or cylindrical glass rod with an aspherical front surface is used as the collimating lens. A GRIN lens is fabricated to have a radially varying index of refraction that is greater towards the center, with the result being that it produces a focusing effect similar to a convex lens. The ferrule, including its associated fiber, and the lens are typically inserted in and bonded to a cylindrical sleeve so that the GRIN lens collimates the light diverging from the smaller core of the optical fiber. The collimator can then be inserted into the optical system with alignment provided by the sleeve. The fixed displacement between the fiber and the GRIN lens in the collimator should provide an optically well-characterized beam, and result in minimum insertion loss between the fiber and the optical system. Such collimators are often commercially available and are fabricated independently of the optical system in which they are to be used. Collimator assemblies typically have the output beam aligned parallel to the cylindrical outer sleeve with up to +/−1.0 degree of tilt.

Optical systems often must receive light from two or more fibers, and thus an array of two or more collimators must be provided. In many cases it is important to align the optical output beams from the array of collimators so that they are all parallel to one another to a high degree of accuracy. Since the introduction of optical devices such as optical cross-connects and optical switches, the proper alignment of the optical beams has become a more stringent requirement. This is because the performance of optical cross-connects and switches is directly related to the stability and parallelism of the optical beams exiting the collimator array. Currently there is a need for collimator arrays whose optical beams are parallel to within 1.0 milliradian or better.

Various techniques have been employed to precisely align collimator arrays. Most of these techniques can be broadly classified into one of two categories based on whether beam alignment is performed in a passive or active manner. In the first category (passive alignment), piece-parts that are manufactured to meet stringent tolerances are employed. Proper alignment is achieved by the precise orientation and registration of the accurately manufactured parts. The piece-parts are usually secured in their proper orientation with epoxy. No active alignment of the individual piece-parts is performed. Collimator arrays with beam parallelism consistently better than about 1 milliradian are difficult to manufacture in accordance with these techniques because the piece-parts generally cannot be manufactured to the required tolerances. Also, consistent registration of the piece-parts to within micron or sub-micron tolerances is difficult or not even possible to achieve.

In the second category of collimator array alignment techniques, alignment is accomplished in an active manner using off-the-shelf piece-parts that only meet customary tolerances that are standard in their respective manufacturing industries. The desired beam alignment accuracy is achieved by adjusting the orientation of the piece-parts of the various collimators in the array while observing the optical beams they produce. Once alignment is achieved, the parts are secured in place with epoxy. Similar to the first category of techniques, collimator arrays with beam parallelism consistently better than about 1 milliradian are difficult to manufacture in accordance with this second category of techniques. A primary reason for this limitation is that the epoxy used to secure the components in place shrinks during the curing process. Typically, the variation in the dimensions of the piece-parts causes gaps that allow adjustment between piece-parts to achieve the desired alignment accuracy. When alignment is completed these gaps are typically non-symmetrical and are generally wedge-shaped. Since heat-cure epoxies shrink during curing, piece-part misalignments will occur and thus errors in the alignment of the optical beam will arise during the epoxy cure because of the non-symmetrical gaps between piece-parts. Even so-called "low-shrink" epoxies shrink in the range of about 1–2%. Another problem is that the coefficient of thermal expansion of most epoxies that are used in practice is much greater than the coefficient of thermal expansion of steel or glass, which leads to alignment errors as the ambient temperature fluctuations.

Accordingly, there is a need for a collimator array that is assembled in a manner that minimizes or eliminates the clearances between piece-parts and/or avoids thick epoxy joints and wedges.

SUMMARY OF THE INVENTION

The present invention provides a method for assembling an optical collimator array. The method begins by directing light through a first optical collimator, which is supported by a first carrier element, to produce a first optical output beam. The first collimator is rotated about its central longitudinal axis to define a first angle between the first optical output beam and the central longitudinal axis. The first optical collimator is secured to the first carrier element and the first carrier element is secured to prevent rotation about the carrier axis. The method continues by rotating a second optical collimator that is supported by a second carrier element and which produces a second optical output beam. The second carrier element is rotated about a carrier axis perpendicular to the central longitudinal axis and in a plane containing the central longitudinal axis to define a second angle between the second optical output beam and the central longitudinal axis. The second optical collimator and the second carrier element continue to be rotated until a difference between the first angle and the second angle is less than a prescribed angular differential. Finally, the second optical collimator is secured to the second carrier element and the second carrier element is secured to the first carrier element.

In accordance with another aspect of the invention, a method is provided for assembling an optical collimator array. The method begins by directing light through a first optical collimator to produce a first optical output beam. The first collimator is supported by a first carrier element. The first collimator is rotated about its central longitudinal axis to adjust a position of the first optical output beam on a surface that intercepts the first optical output beam. The first carrier element is then rotated about a carrier axis perpendicular to the central longitudinal axis and in a plane containing the central longitudinal axis to further adjust the position of the first optical output beam on the surface. The first collimator continues to be rotated about these axes until the first optical output beam is located at a desired position on the surface, at which point the first optical collimator is secured to the first carrier element. Next, the first carrier element itself is secured to prevent rotation about the carrier axis. The aforementioned steps are repeated for a second optical collimator producing a second optical output beam, which is supported by a second carrier element. The second optical collimator continues to be rotated about the two axes until the second optical output beam is located at a second position on the surface that is offset from the position of the first optical output beam by a prescribed amount. Finally, the second optical collimator is secured to the second carrier element and the second carrier element is secured to the first carrier element.

In accordance with one aspect of the invention, the offset between the positions of the first and second optical output beams on the surface is selected so that the beams are parallel to within less than about 1 milliradian.

In accordance with another aspect of the invention, the offset between the positions of the first and second optical output beams on the surface is selected so that the beams are parallel to within less than about 0.3 milliradian.

In accordance with yet another aspect of the invention, the offset between the positions of the first and second optical output beams on the surface is selected so that the beams are parallel to within about 0.1 to 1 milliradians.

DETAILED DESCRIPTION

The present invention provides an array of collimators that are precisely aligned so that their output beams are parallel to one another. The degree of parallelism that can be achieved may be in some cases 0.3 milliradians or less. The individual collimators that are employed in the present invention may be commercially available collimators. The collimators and other piece-parts that are employed only need to be fabricated to meet standard tolerances. As explained below, the various piece-parts are assembled in such a way that the thickness of the joint formed by the epoxy bond between certain components is essentially zero. Those bonds that do require a thick joint are arranged so that any epoxy shrinkage that does occur will be in a direction that does not affect the accuracy of the optical beam's alignment. Moreover, because the epoxy bond is very thin, the alignment accuracy is maintained over large temperature fluctuations. That is, the present invention achieves not only a high degree of alignment but also a high degree of alignment that is maintained over a large temperature range.

Figure 1:
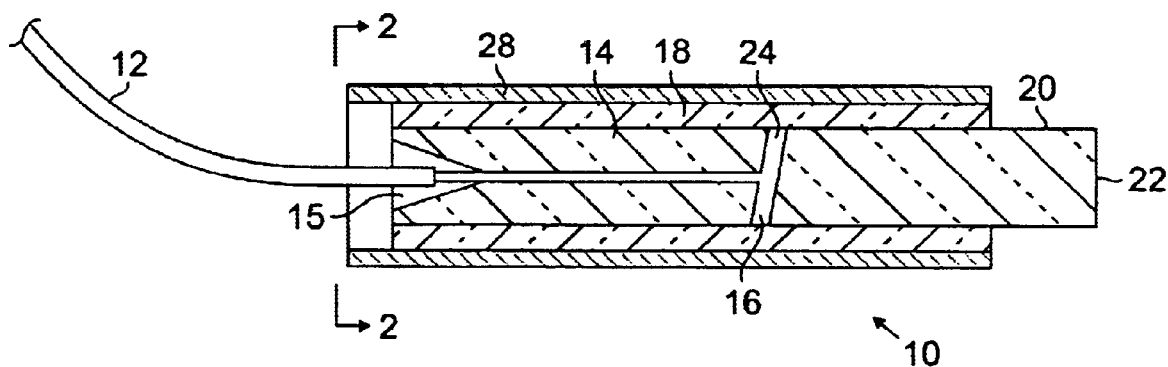
FIG. 1 shows an exemplary conventional optical collimator that may be employed in the present invention.

For purposes of illustration only, one example of a collimator that may be used in the present invention will be described with reference to FIG. 1. Collimator 10, which is illustrated in a side cross-sectional view in FIG. 1, includes an optical fiber 12 that is received within the central axial aperture of a glass ferrule 14. The fiber 12 typically includes a silica-based core and cladding, and a surrounding polymeric cover such as of an acrylate material. The polymeric cover is stripped from the fiber 12 in the portion received by the ferrule 14. For strength and thermal stability, the polymeric cover extends into a conical aperture 15 formed in the end of the ferrule 14 but does not touch the ferrule 14 itself. As a result, the ferrule 14 typically holds only the core and cladding of the fiber 12.

The end faces 16 of the ferrule 14 and fiber 12 are cleaved, ground, and polished at a predetermined facet angle to prevent back reflection along the optical axis. The ferrule 14 fits snugly but easily slidably within the central bore of a glass tube 18 and is eventually bonded to it. A graded-index (GRIN) lens 20 also fits within the bore of the glass tube 18 and is bonded to it. A typical dimension of the bore of the tube 18 is about 1.0 mm with the outer diameters of the ferrule 14 and the GRIN lens 20 being several micrometers smaller to provide both good axial alignment and easy sliding between the two parts. The GRIN lens 20 is shaped like a rod and has an index of refraction varying along its radius so as to act like a convex lens. Preferably, the GRIN lens 20 has a plano end 22 facing the exterior of the collimator 10 and an end 24 having similar slope and orientation as the inner end 16 of the ferrule 14. After the alignment, the glass tube 18 fits in and is bonded to a cylindrical metal sleeve 28, for example, a gold-plated stainless-steel tube. Additional details concerning collimator 10 may be found in U.S. Pat. No. 6,168,319.

Generally, in commercially available collimators the optical output beam is not precisely aligned with the longitudinal center axis of the cylindrical sleeve. While collimator manufactures attempt to keep the angle between the output beam and center axis as small as possible, the output beam is typically tilted by about 0.5–1.0 degrees with respect to the longitudinal center axis of the cylindrical sleeve. As described below, the present invention uses this feature of commercial collimators, which is effectively a manufacturing flaw or limitation, to precisely align the optical beams from 2 or more collimators.

Figure 2:
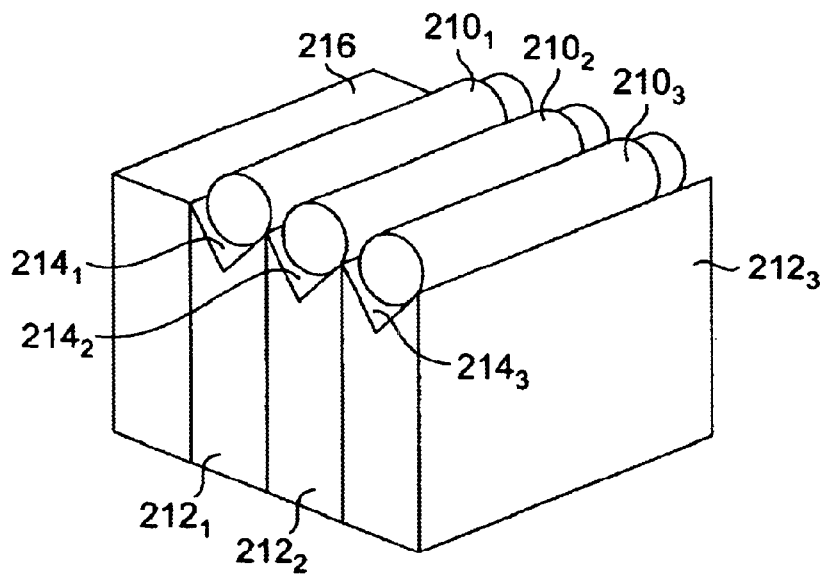
FIG. 2 shows one embodiment of a collimator array constructed in accordance with the present invention.

FIG. 2 shows one embodiment of a collimator array 200 constructed in accordance with the present invention. Collimator array includes a series of collimators 210₁–210₃. The collimators 210₁–210₃ are respectively fixed to carrier elements 212₁–212₃. The carrier elements 212₁–212₃ each include a V-shaped groove 214₁–214₃ along their upper surfaces for receiving the collimators. That is, the longitudinal axis of the collimators extend along the V-grooves. The outer surface of the collimator sleeves are affixed in the V-grooves by an adhesive such as epoxy. Adjacent ones of the carrier elements $212_1$–$212_3$ are affixed to one another, also by an adhesive such as epoxy. Finally, the first carrier element $212_1$ is affixed to a base element 216 that serves as the initial support on which the collimator array is constructed. Base element 216, may be, for example, a carrier element that does not support a collimator.

Figure 3:
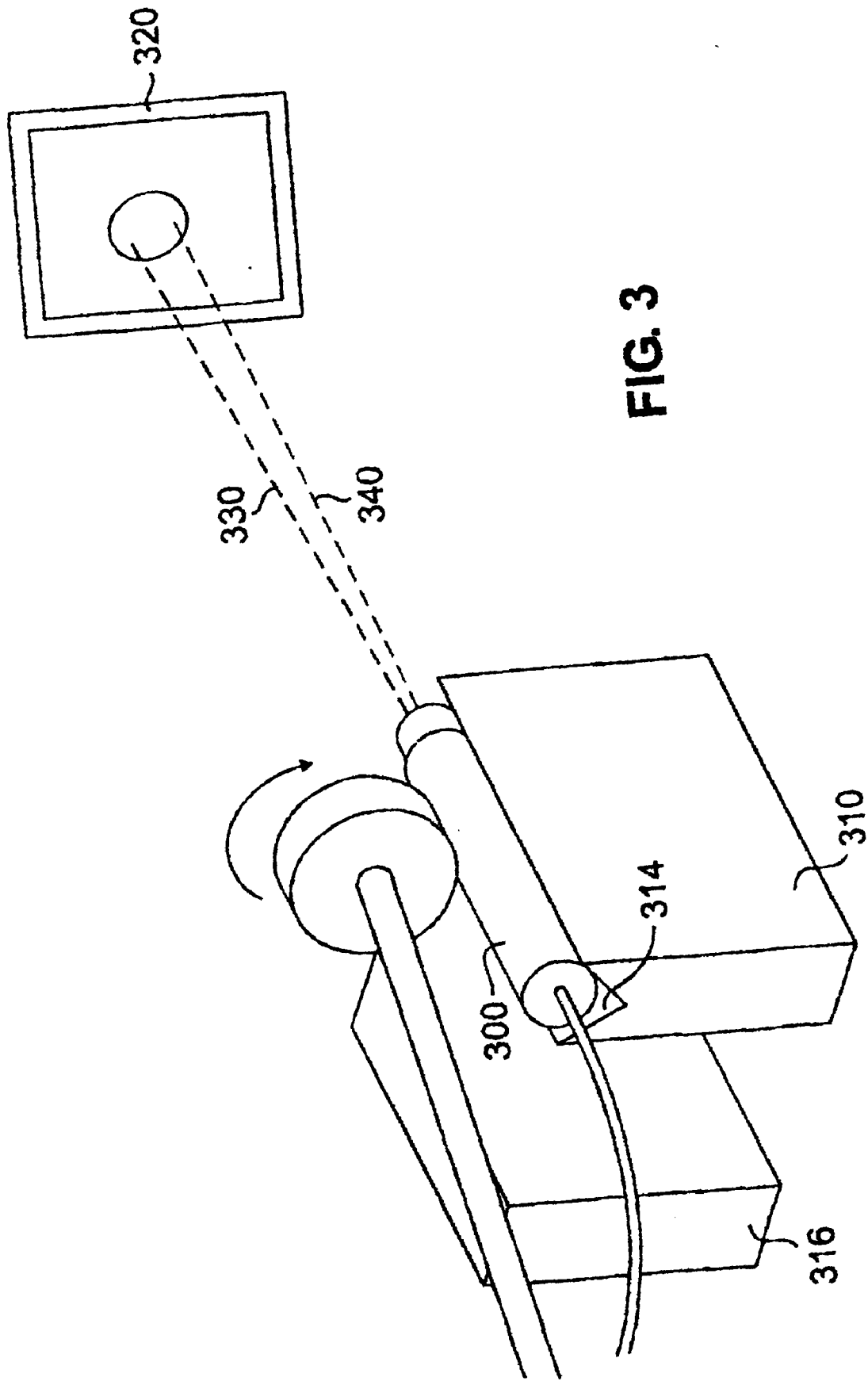
FIG. 3 shows the process by which the collimator array of FIG. 2 is assembled.

FIG. 3, which shows a single collimator 300 situated in the V-groove 314 of a carrier element 310, will be used to illustrate the general principals by which the output beams of the collimators are aligned with one another. One particular method of implementing these general principals will be described below in connection with FIG. 4. As shown, a screen 320 is positioned to intercept an optical beam 330 exiting collimator 300. Because the outer sleeve of collimator 300 is cylindrical, it can be rotated about its central longitudinal axis 340. Since, as previously mentioned, in commercially available collimators the optical output beam is not precisely aligned with the longitudinal center axis of the cylindrical sleeve but rather is offset by the angle θ, the beam spot appearing on the screen 320 will move in a circular path as the collimator is rotated. If desired, the angle θ can be determined by measuring the diameter of the circular path and the distance from the collimator 300 to the screen 320.

In order to provide the movement of the beam spot with an additional degree of freedom, while rotating the collimator 300 about its central longitudinal axis 340, the carrier element 310 itself may be rotated in a vertical plane. Specifically, the carrier element 310 may be rotated about an axis perpendicular to the central longitudinal axis 340 of the collimator 300 and in a plane containing the central longitudinal axis 340. Such rotation will cause the motion of the beam spot on screen 320 to have a second component in the y-direction that is independently adjustable from its first, circular component arising from the collimator's rotation about its central longitudinal axis 340. Accordingly, by proper rotation about these two axes, the beam spot can be positioned at any desired location on the screen 320.

Continuing with reference to FIG. 3, the inventive technique for accurately aligning the output beams from an array of collimators begins by rotating the collimator 300 about its central longitudinal axis 340 while rotating the carrier element 310 in the aforementioned vertical plane until the beam spot is positioned at some desired location on the screen. Once this is accomplished, adhesive may be applied to the V-groove 314 of the carrier element 310 so that the collimator 300 is affixed therein. In addition, the carrier element 310 may be affixed to a base element 316 that serves as the base element 216 seen in FIG. 2. An adhesive such as epoxy or other means may be employed to secure the carrier element 310 to the base element 316. The base element 316 prevents the carrier element 310 from further rotating in the vertical plane.

Since the epoxy bond lines between the collimator 300 and the carrier element 310, as well as between the carrier element 310 and the base element 316 has virtually no thickness, no movement occurs during the epoxy cure. Accordingly, the alignment of the optical beam is not disturbed by shrinkage of the epoxy during the curing process The alignment process of the present invention continues by placing a second carrier element (not shown in FIG. 3), which supports a second collimator (also not shown in FIG. 3), up against the first carrier element 310. The second collimator is now aligned in the same manner as the first collimator 300. That is, with an optical beam exiting the second collimator, the second collimator is rotated about its central longitudinal axis and the second carrier element is rotated in the vertical plane until the beam spot from the second collimator is offset by the appropriate amount from the beam spot of the first collimator, indicating that the optical beams from the two collimators are parallel. In some embodiments of the invention, the optical beams from the two collimators are parallel to within less than 1 milliradian, and preferably between 0.3 and 1 milliradians or even less. Once this alignment has been performed, the second collimator may be secured to the second carrier element and the second carrier element may be secured to the first carrier element. Once again, adhesive such as epoxy may be used to secure both components.

The aforementioned alignment process may be repeated until as many collimators as desired are incorporated into the collimator array. When each subsequent collimator is aligned, its associated carrier element is secured to the previously aligned carrier element to obtain the structure depicted in FIG. 2.

Figure 4:
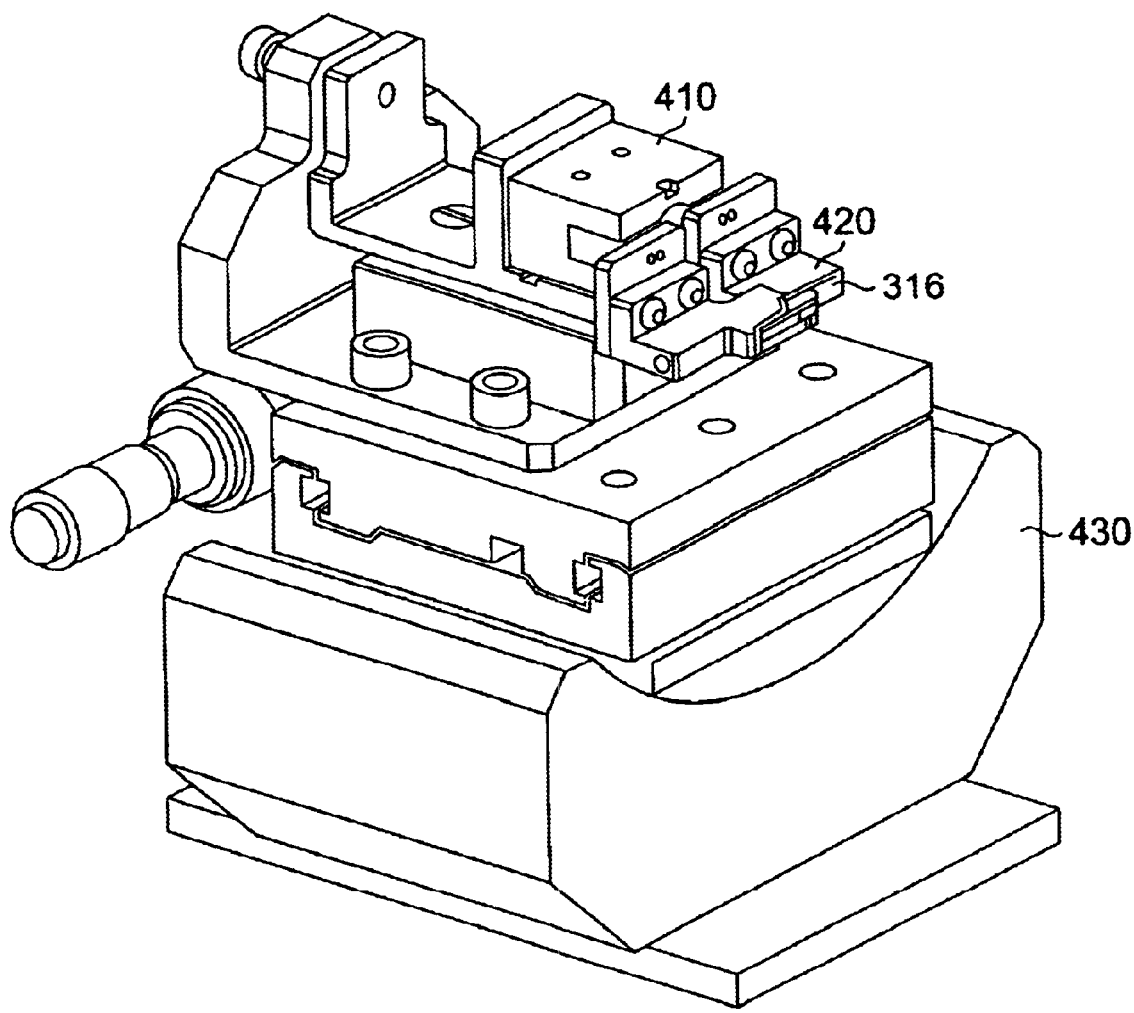
FIG. 4 shows an alignment fixture that may be employed in the assembly process illustrated in FIG. 3.

FIG. 4 shows one example of an alignment fixture that may be employed to facilitate the practice of the present invention. The alignment fixture is used to mechanically hold and manipulate the piece-parts during the alignment process. Of course, those of ordinary skill in the art will recognize that a large variety of different arrangements may be used to assemble the collimator array in accordance with the present invention and that the present invention is not limited to the arrangement depicted in FIG. 4. As shown, the alignment fixture includes a robotic gripper 410 that supports the base element 316 in a fixed position on a rotation stage 430. Rotation stage 430 can rotate about an axis centered on the carrier element. Robotic gripper 410 is used to automatically rotate the carrier element by prescribed amounts about an axis perpendicular to the central longitudinal axis of the collimator and in a plane which contains the central longitudinal axis. The alignment fixture also includes a heating element located in a heated fixture jaw 420 that contacts the base element 316 so that sufficient thermal energy can be provided to cure the epoxy that will be subsequently applied. Rotation of the collimator about its central longitudinal axis by the robotic gripper 410 may be accomplished with a rubber wheel such as shown in FIG. 3.The rubber wheel may be rotated by a rotary actuator (not shown) so that frictional forces between the rotating wheel and the collimator cause the collimator to rotate in the V-groove.

In some embodiments of the invention the position of the beam spots on the screen 320 may be automatically determined. For example, screen 320 may be a CCD screen that is under computer control via a frame-grabber. The computer can electronically store the location of the beams on the screen and determine when the second beam spot is appropriately offset from the first beam spot.

Table 1 shows measured results from a collimator that was constructed in accordance with the present invention and which included 8 collimators. The angular orientation of each collimator was measured at 25° C. and 120° C. The data demonstrates that the alignment of each collimator deviates by less than 0.3 mRad over a temperature range of 95° C.

TABLE 1

| Collimator Position | x-angle (mrad) | y-angle (mrad) | Composite angle (mrad) |
|---|---|---|---|
| At 25 C. | | | |
| 1 | 0.12101 | −0.26013 | 0.28690 |
| 2 | −0.09374 | −0.06295 | 0.11292 |
| 3 | −0.09282 | −0.00381 | 0.09289 |
| 4 | 0.00050 | 0.01429 | 0.01430 |
| 5 | 0.01882 | −0.16933 | 0.17037 |
| 6 | −0.00716 | 0.06969 | 0.07005 |
| 7 | 0.04094 | 0.00133 | 0.04096 |
| 8 | −0.16749 | −0.03327 | 0.17076 |
| At 120 C. | | | |
| 1 | 0.05555 | 0.00237 | 0.05560 |
| 2 | −0.10785 | 0.07983 | 0.13418 |
| 3 | −0.03762 | 0.14754 | 0.15226 |
| 4 | −0.00982 | −0.00581 | 0.01141 |
| 5 | 0.06154 | 0.04506 | 0.07627 |
| 6 | 0.00348 | 0.06295 | 0.06305 |
| 7 | −0.00877 | 0.01924 | 0.02114 |
| 8 | −0.12498 | 0.14886 | 0.19436 |

Although various embodiments are specifically illustrated and described herein, it will be appreciated that modifications and variations of the present invention are cevered by the above teachings and are within the purview of the appended claims without departing from the spirit and intended scope of the invention. For example, while the present invention has been described in terms of a single row of collimators, those of ordinary skill in the art will recognize that the invention also encompasses two dimensional arrays of collimators.

What is claimed is:

1. A method for assembling an optical collimator array, comprising:

(i) directing light through a first optical collimator to produce a first optical output beam, said first collimator being supported by a first carrier element;

(ii) rotating the first collimator about its central longitudinal axis to define a first angle between first optical output beam and the central longitudinal axis;

(iii) securing the first optical collimator to the first carrier element;

(iv) securing the first carrier element to prevent rotation about the carrier axis;

(v) rotating a second optical collimator supported by a second carrier element, said second optical collimator producing a second optical output beam, and, rotating the second carrier element about a carrier axis perpendicular to the central longitudinal axis and in a plane containing the central longitudinal axis to define a second angle between the second optical output beam and the central longitudinal axis;

(vi) performing step (v) until a difference between the first angle and the second angle is less than a prescribed angular differential;

(vii) securing the second optical collimator to the second carrier element; and (viii) securing the second carrier element to the first carrier element.

2. The method of claim 1 wherein said prescribed angular differential is less than about 0.3 milliradian.

3. The method of claim 1 wherein said prescribed angular differential is between about 0.1 and 1 milliradians.

4. The method of claim 1 wherein step (ii) further comprises the step of rotating the first carrier element about a carrier axis perpendicular to the central longitudinal axis and in a plane containing the central longitudinal axis.

5. The method of claim 1 wherein step (ii) further comprises the step of locating the first optical output beam on a surface intercepting the first optical output beam.

6. The method of claim 5 wherein step (v) further comprises the step of locating the second optical output beam on the surface.

7. The method of claim 6 wherein step (vi) further comprises the step of determining an offset between the location of the first optical output beam on the surface on and the location of the second optical output beam on the surface.

8. A collimator array fabricated in accordance with the method of claim 1.

9. A collimator array fabricated in accordance with the method of claim 2.

10. A method for assembling an optical collimator array, comprising:

(i) directing light through a first optical collimator to produce a first optical output beam, said first collimator being supported by a first carrier element;

(ii) rotating the first collimator about its central longitudinal axis to adjust a position of the first optical output beam on a surface intercepting the first optical output beam;

(iii) rotating the first carrier element about a carrier axis perpendicular to the central longitudinal axis and in a plane containing the central longitudinal axis to further adjust the position of the first optical output beam on the surface;

(iv) performing steps (ii) and (iii) until the first optical output beam is located at a desired position on the surface;

(v) securing the first optical collimator to the first carrier element;

(vi) securing the first carrier element to prevent rotation about the carrier axis;

(vii) repeating steps (i)—(iii) for a second optical collimator supported by a second carrier element, said second optical collimator producing a second optical output beam;

(viii) repeating step (iv) for the second optical collimator and the second carrier element until the second optical output beam is located at a second position on the surface that is offset from the position of the first optical output beam by a prescribed amount;

(ix) securing the second optical collimator to the second carrier element;

(x) securing the second carrier element to the first carrier element.

11. The method of claim 10 wherein said offset between positions of the first and second optical output beams on the surface is selected such that said first and second optical output beams are parallel to within about 0.3 milliradian.

12. A collimator array fabricated in accordance with the method of claim 11.

13. The method of claim 10 wherein said offset between positions of the first and second optical output beams on the surface is selected such that said first and second optical output beams are parallel to within less than about 1 milliradian.

14. The method of claim 10 wherein said offset between positions of the first and second optical output beams on the surface is selected such that said first and second optical output beams are parallel to within about 0.1 tol milliradians.

15. The method of claim 10 wherein said surface is a screen upon which the first and second optical output beams are projected.

16. The method of claim 10 wherein said surface electronically records the positions of the first and second optical output beams.

17. A collimator array fabricated in accordance with the method of claim 10.

* * * * *